United States Patent [19]

Hall et al.

[11] Patent Number: 4,976,307
[45] Date of Patent: Dec. 11, 1990

[54] APPARATUS AND METHOD FOR SEALING TUBES

[76] Inventors: Charles Hall, 7763 Kennesaw Dr., West Chester, Ohio 45069; Michael Fry, 1558 Whittlou Ave., Cincinnati, Ohio 45224

[21] Appl. No.: 272,554
[22] Filed: Nov. 17, 1988
[51] Int. Cl.⁵ .................. F28F 11/06; F16L 55/11
[52] U.S. Cl. ........................ 165/76; 29/447; 138/89; 138/97
[58] Field of Search ............. 29/401.1, 447; 138/89, 138/97; 165/76

[56] References Cited

U.S. PATENT DOCUMENTS

| | | | |
|---|---|---|---|
| 3,900,939 | 8/1975 | Greacen | 29/401 |
| 4,573,248 | 3/1986 | Hackett | 29/423 |
| 4,637,436 | 1/1987 | Stewart, Jr. et al. | 138/89 |
| 4,723,578 | 2/1988 | Mordarski et al. | 138/97 |

FOREIGN PATENT DOCUMENTS

| | | | |
|---|---|---|---|
| 1380964 | 1/1975 | United Kingdom | 138/89 |
| 2094435A | 9/1982 | United Kingdom | 138/89 |

Primary Examiner—Martin P. Schwadron
Assistant Examiner—Allen J. Flanigan
Attorney, Agent, or Firm—Frost & Jacobs

[57] ABSTRACT

A plug member adapted for insertion into a tube end seals about its periphery in response to a predetermined activation to prevent fluid flow through the tube. In one embodiment, the plug contains annular rings that expand radially outwardly in response to thermal excitation. In an alternate embodiment, a welding material is forced about the plug periphery to seal with the interior surface of a tube in response to a predetermined activation.

18 Claims, 4 Drawing Sheets

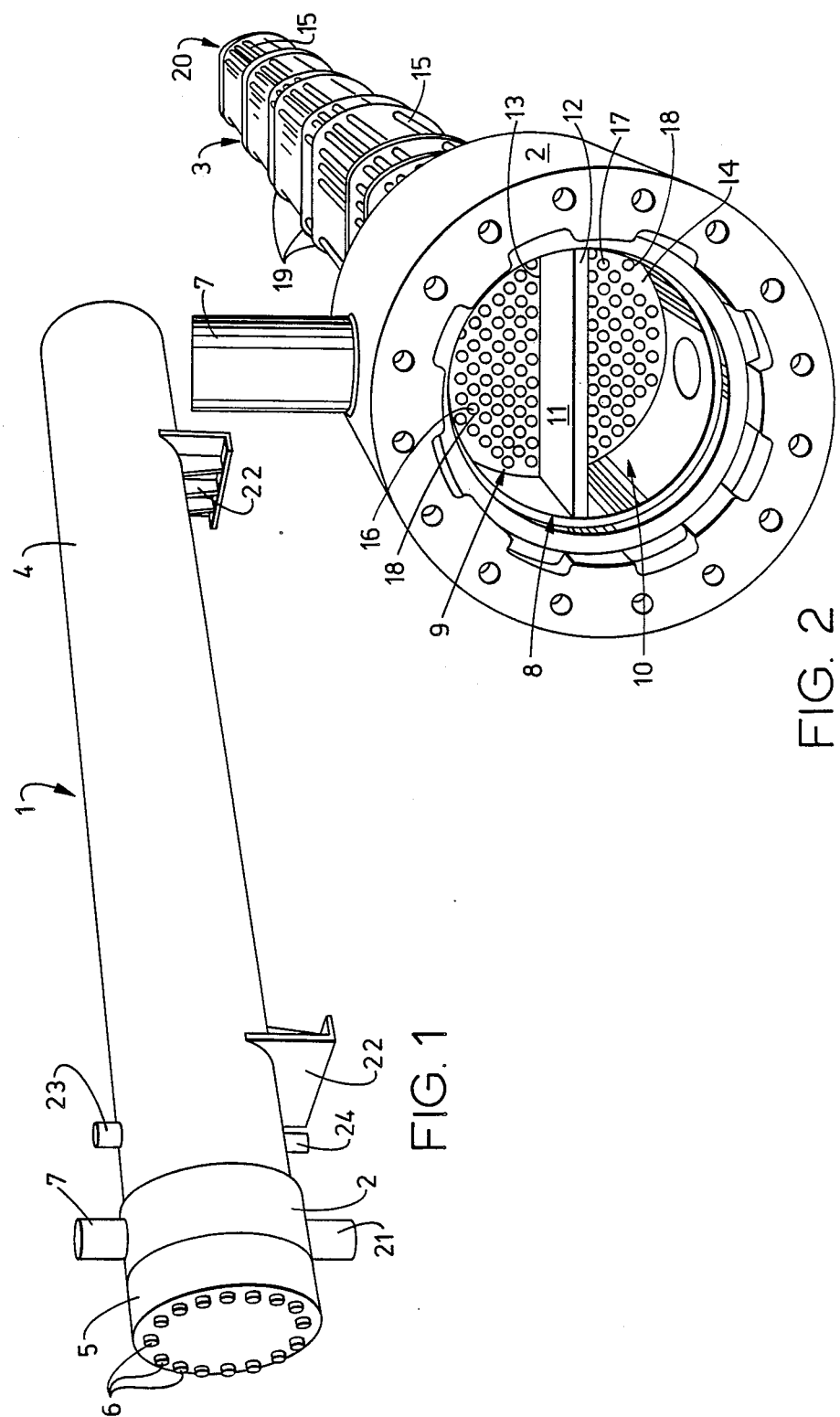

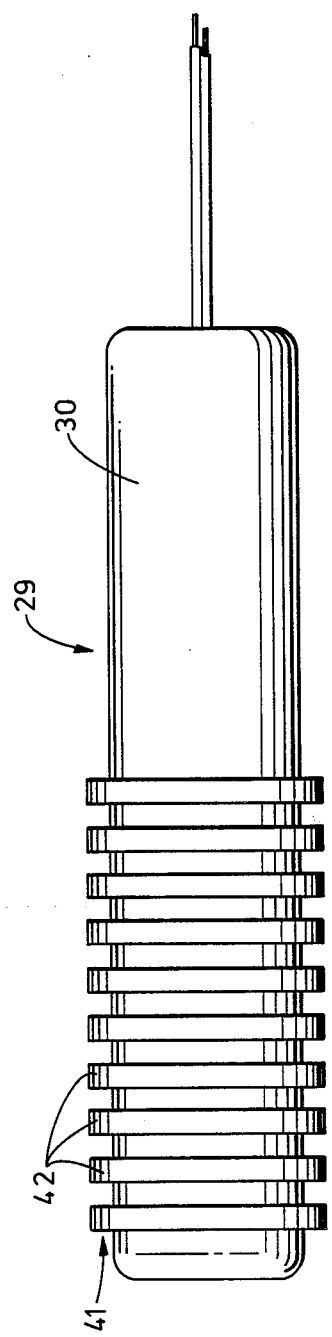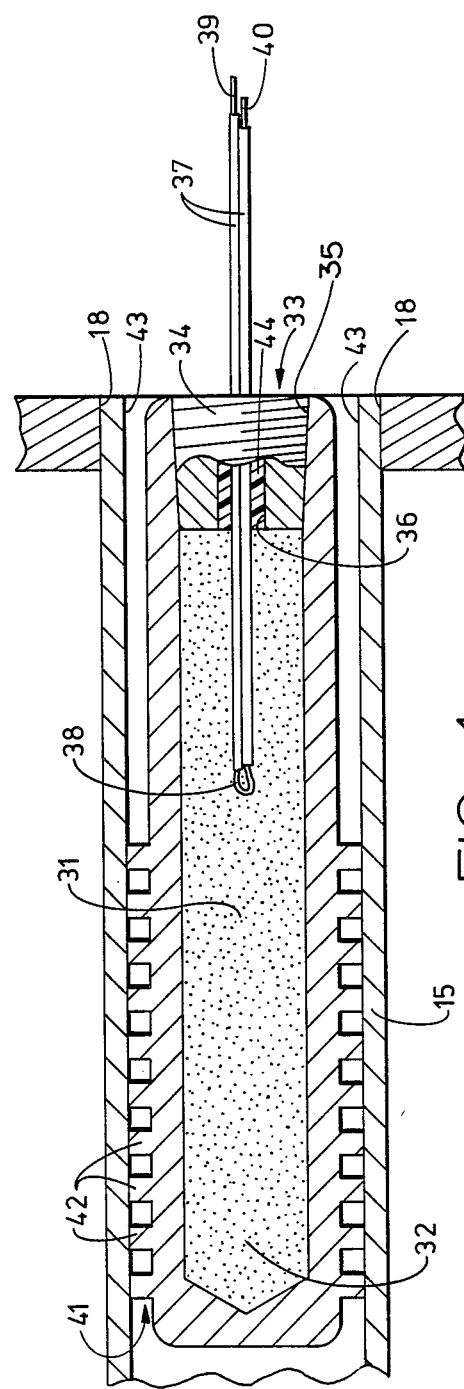

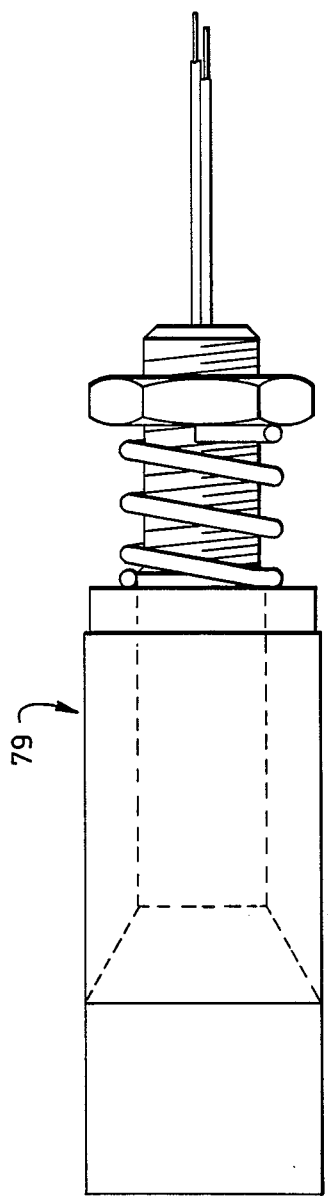
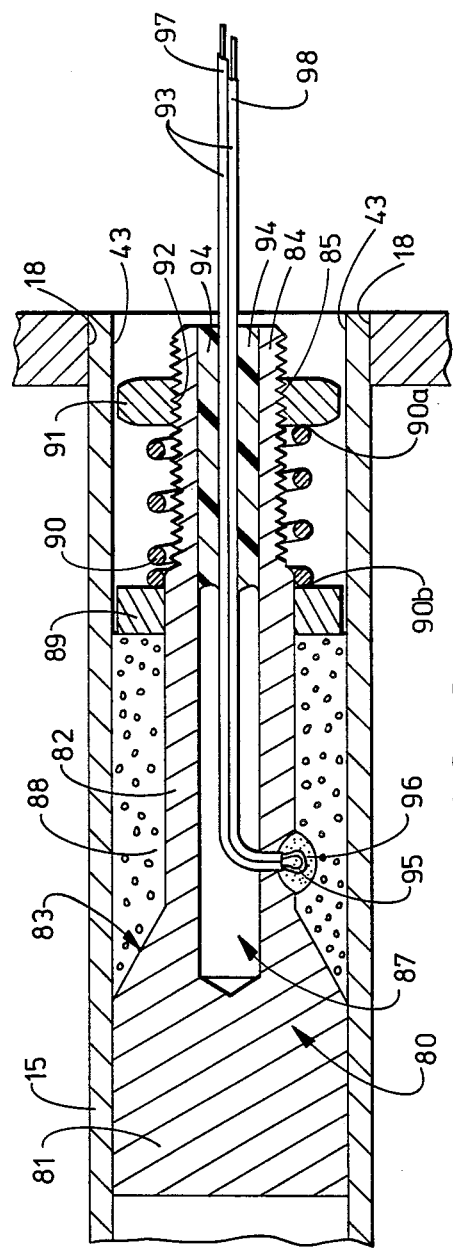

APPARATUS AND METHOD FOR SEALING TUBES

TECHNICAL FIELD

The present invention relates generally to a method and apparatus for sealing tubes that is particularly useful for sealing the ends of heat exchanger tubes. The invention, which is useful in a wide variety of heat exchangers, will be specifically disclosed in connection with a plug for a feed water heater which expands to create sufficient sealing force due to internally or externally supplied heat.

BACKGROUND OF THE INVENTION

Steam power plants generate electrical energy by driving generators which are connected to turbines. High pressure steam is created in the boiler when heat is applied to water in the boiler. The source of this heat may be the burning of fossil fuel, nuclear reaction, or other heat sources. As the water temperature in the boiler rises, high pressure steam is created and delivered through pipes to a steam turbine, where the steam is expanded to a lower pressure while driving the turbine. The low pressure steam then flows from the turbine to a condenser, where the steam condenses to the liquid state. The water is then returned to the boiler, forming a closed loop system.

To increase the efficiency of the power plant, heat exchangers known as feeder water heaters are located in the flow line between the condenser and the boiler. The water from the condenser, known as feed water, flows through pipes to one or more feed water heaters. In the feed water heater, the feed water flows through tubes which are contained within an outer shell. The feed water exits the feed water heater and flows into the boiler. A continuous flow of high pressure steam is extracted from the boiler and fed into the interior of the outer shell of the feed water heater where the steam flows around the tubes. This results in the transfer of heat from the extract steam to the feed water which is flowing through the tubes, thereby raising the temperature of the feed water. This also results in a decrease in the temperature of the extract steam as it exits the feed water heater outer shell. The extract steam is then returned to the boiler through a line which is separate from the feed water line.

A feed water heater is typically made up of several U-shaped tubes, up to 40 feet long, which are contained within an outer shell. A feed water heater may have several hundred of these tubes. Both ends of the U-shaped tubes usually terminate in a single manifold, known as a tube sheet. The inlet ends of the tubes terminate in a first opening which is partitioned from a second opening in which the outlet ends of the tubes terminate. Each opening communicates directly with the feed water inlet and feed water outlet respectively. Steam flows through the shell and around the outside of these tubes, thereby transferring heat to the feed water.

Occasionally these tubes develop leaks at some point along their length. When this occurs, the feed water heater must be shut down. In order to keep the Power Plant operating, the feed water is simply rerouted to bypass the feed water heater through a system of valves. When a power plant is forced to shut down a feed water heater, the decrease in efficiency in generating power requires the power plant to use more fuel in order to generate the same amount of electrical energy. The burning of extra fuel can result in extra cost of up to $200,000 per day, due to the inoperation of a feed water heater. It is thus imperative that the feed water heater be returned to operation as quickly as possible.

The preferred method to return the feed water heater to service is to seal both the inlet and outlet ends of the leaky U-shaped tube at the tube sheet. This is much faster and substantially more economical than replacing the entire tube or the tube bundle. Experience has shown that a feed water heater may be operated economically even when up to 10% of the tubes within the feed water heater have been plugged. If more than 10% of the tubes are plugged, the efficiency of the system declines to a level at which it is more economical to replace or repair the U-shaped tube bundles. An advantage of plugging the ends of the tubes, even when more than 10% have been plugged, is that the removal of the feed water heater from service and subsequent repair or replacement may be planned in advanced and executed in an economical, orderly, non-crisis manner.

The plugging of the inlet and outlet ends of a leaky U-shaped tube is almost always done under extreme time constraints. Due to the monetary loss per day of an inoperative feed water heater, power plant operators are willing to spend significant amounts of money to have the tubes plugged. The most prevalent current practice requires the installation of an explosive plug into each end of the leaky U-shaped tube. To do this, the head cover of the feed water heater is removed, giving access to the tube sheet in which the U-tubes terminate. A plug is inserted into the defective tube at the tube sheet and then the explosive charge within the plug is detonated, thereby sealing the tube with the plug. It is necessary when the plug is detonated to clear the area of people and sound a warning siren for safety. Once the plug is detonated the manway must be ventilated and the gases from the explosion removed prior to inspecting the result.

In order to place the plug in the end of the tube, it is necessary for a person to climb into the end of the feed water heater. The feed water heater normally operates in the range of 400° F. up to 600° F., and must be cooled before a person can climb into it. This results in additional delays in returning the feed water heater to operation. It is also necessary for the tubes to cool to a sufficient temperature whereby the explosive charge in the plug is not effected by heat when inserted into the tube.

The explosive charge contained in such plugs is heavily regulated by the government and may be handled only by certified experts. The explosive charges and plugs require special handling and storage due to this governmental regulation. Because of this, the plugs may not be shipped by conventional means, and may not be kept conveniently at a power plant site. The result is that specialized companies maintain a supply of explosive plugs on call for power plants. In the event that a feed water heater must be plugged, a team of experts and the explosive plugs are then transported to the location. This results in additional delays and expenses before the tube can be plugged.

SUMMARY OF THE INVENTION

Accordingly, it is a primary object of the present invention to provide a plug which may be used to quickly and effectively seal the end of a tube of a heat exchanger.

It is another object of the invention to provide a plug which may be economically and safely stored at a power plant site, and installed by power plant personnel.

It is still a further object of the present invention to provide a plug which has an internal source of heat that is used to expand the plug into sealing engagement with a tube of a heat exchanger.

It is yet another object of the present invention to provide a method for sealing the ends of a tube in a heat exchanger which may be simply and easily understood and executed by power plant personnel.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentality and combinations particularly pointed out in the appended claims.

To achieve the foregoing and other objects and in accordance with the purposes of the present invention as described herein, an improved device is provided for sealing the interior peripheral surface of a tube. The device includes a plug body having a means for sealing the internal peripheral surface of a tube in response to the elevation of the temperature of the sealing means above a predetermined level. A heat source is provided which is operative to selectively raise the temperature of the sealing means above a predetermined level in response to a predetermined activation. An activation means is further provided for activating the heat source.

In accordance to a further aspect of the invention, an outer portion is disposed about the plug which is made of an alloy capable of at least two allotropic states.

According to a further aspect of the invention, the outer portion of the plug has an outer first allotropic diameter smaller than the inner diameter of the tube to be sealed and a second allotropic diameter equal to or greater than the inner diameter of the tube to be sealed.

In yet another aspect of the invention, the outer portion includes a plurality of spaced external annular rings formed in the periphery of the outer portion.

In a still further aspect of the invention, the outer portion is integral with the plug body.

In accordance to another aspect of the invention, the heat source is a metal reduction combustible exothermic compound providing a flow of such reduced metal.

In yet another aspect of the invention, the actuating means is an electrical wire connectible to a source of electricity which is in thermal contact with the exothermic compound.

In still another aspect of the invention, the actuating means is an ignitable fuse.

In yet another aspect of the invention, the plug body defines an internal cavity in which an exothermic compound is disposed. The cavity has a opening at one end of the plug body.

In still a further aspect of the invention, the internal cavity is sealed at the opening by a plug. The plug has a hole through which the communicating fuse, which may be an electrical wire or a pyrotechnical fuse, passes, and the hole is sealed with a sealant material.

In accordance with another aspect of the invention, the sealing means is a material having a predetermined melting temperature that flows in response to heat and pressure.

Still other objects of the present invention will become apparent to those skilled in this art from the following description wherein there is shown and described a prefer embodiment of this invention, simply by way of illustration, of one of the best modes contemplated for carrying out the invention. As will be realized, the invention is capable of other different embodiments, and its several details are capable of modification in various and obvious aspects all without departing from the invention. Accordingly, the drawings and description will be regarded as illustrative in nature and not as restrictive.

BRIEF DESCRIPTION OF THE DRAWINGS

The accompanying drawings incorporated in and forming a part of the specification illustrate several aspects of the present invention, and together with the description served to explain the principles of the invention. In the drawings:

FIG. 1 is a perspective view of a feed water heater;

FIG. 2 is an end perspective view of a feed water heater showing the tube bundle and manway;

FIG. 3 is a side elevational view of a preferred embodiment of the present invention;

FIG. 4 is a cross sectional side view of the embodiment of FIG. 3 shown disposed in a tube;

FIG. 8 is a side view of a third embodiment of the present invention; and

FIG. 9 is a cross sectional side view of the embodiment of this invention shown in FIG. 8, shown disposed in a tube.

Figure 6:
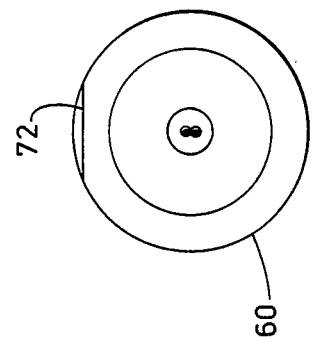
FIG. 6 is an end view of the embodiment of the Present invention shown in FIG. 5.

Reference will now be made in detail to the present preferred embodiments of the invention, examples of which are illustrated in the accompanied drawings.

DETAILED DESCRIPTION OF THE PREFERRED EMBODIMENT

Referring now to the drawings, FIG. 1 shows a side perspective view of a typical feed water heater. FIG. 2 shows the channel 2 and tube bundle 3 which is contained by shell 4. Channel 2 is covered by head cover 5, which is secured to channel 2 by head cover studs 6. Water flows through water inlet 7 into internal cavity/manway 8. Internal cavity 8 has inlet portion 9 and outlet portion 10. Inlet portion 9 is separated from outlet portion 10 by pass partition 11. Pass partition 11 has surface 12 which forms a seal with the inside of head cover 5 when head cover 5 is secured in place. Pass partition 11 also forms a seal with tube sheet 14 at surface 13. Thus, when head cover 5 is secured in place, inlet portion 9 is completely sealed from outlet portion 10.

Tubes 15 have inlet ends 16 which are sealed to the tube sheet bores 18, terminating in inlet portion 9. Tubes 15 extend from tube sheet 14 from the side opposite inlet portion 9 into tube bundle 3. Tubes 15 are supported in tube bundle 3 by tube supports/baffles 19. The tubes 15 generally have a U shaped mid-section (not shown) at end 20 of tube bundle 3. Outlet ends 17 of tubes 15 are sealed in communication with bores 18 terminating in communication with outlet portion 10. Water outlet 21 communicates directly with outlet portion 10.

Shell 4 forms an enclosure around tube bundle 3 and is supported by shell supports 22. Shell 4 has steam inlet 23 which communicates directly with the internal cavity of shell 4. At the opposite end, shell 4 has steam outlet 24, which also communicates directly with the internal cavity of shell 4.

In operation, water which is to be heated flows into feed water heater 1 through water inlet 7, into inlet portion 9. From inlet portion 9, water flows through tubes 15 to outlet portion 10. Water then flows from the feed water heater through water outlet 21. Steam, from which heat is transferred to raise the temperature of the water, flows into the internal cavity of shell 4 through steam inlet 23. The steam is directed around tubes 15 of tube bundle 3 by tube supports/baffles 19 and exits shell 4 at steam outlet 24. Heat is transferred to the water flowing through tubes 15 from the steam which flows around the outside of tubes 15.

If a tube 15 develops a leak between inlet end 16 and outlet end 17, water will flow from tube 15 into the internal cavity of shell 4. Feed water heater 1 cannot be operated when such a leak exists. To return the feed water heater 1 to service, the flow of water through water inlet 7 is interrupted and rerouted by valves to bypass the feed water heater. Similarly, the flow of steam to steam inlet 23 is interrupted and rerouted by valves to bypass the feed water heater 1. Water is drained from feed water heater 1, which is then allowed to cool sufficiently so that head cover 5 may be removed by removing head cover studs 6. Internal cavity/manway 8 is thus exposed, giving access to tube sheet 14 and inlet ends 16 and outlet ends 17 of tubes 15. When the leaking tube 15 is identified, inlet end 16 and outlet end 17 are permanently plugged so that water may not flow from inlet portion 9 or outlet portion 10 into tube 15.

FIGS. 3 and 4 show side views of a preferred embodiment of the present invention, which is used to seal the ends 16 and 17 of tubes 15. A plug body 30 is shown having an internal cavity 31. Internal cavity 31 is filled with an exothermic compound, in this case, as for example, magnesium 32. Internal cavity 31 has an opening 33 which is sealed by plug 34. Plug 34 is shown as being a threaded taper plug which is engaged with mating tapped wall 35 adjacent opening 33. Plug 34 has a hole 36 which communicates directly with internal cavity 31. Wire 37 is disposed through hole 36 and forms loop 38 inside of internal cavity 31 in direct contact with the exothermic compound 32, which is magnesium in this specifically described embodiment. Ends 39 and 40 of wire 37 are connectable to a source of electricity (not shown).

Hole 36 is sealed by a sealant 44 which also seals and holds wire 37 in place. Sealant 44 is a material which has a melting temperature that is lower than the activation, or combustion, temperature of exothermic compound 32.

Outer portion 41 is disposed about plug body 30, and is shown as being integrally formed with plug body 30. Outer portion 41 is comprised of a plurality of annular rings 42, having outside perimeters which are circular and, in the first allotropic state, are slightly smaller than the inside diameter of the tube to be sealed. In FIGS. 3 and 4, there are ten annular rings 42 shown, which have been calculated to be sufficient to seal the tube in the manner described below. The outer Portion 41 and therefore annular rings 42 are formed of an alloy that has at least two allotropic states, the first of which states has a higher density (and thus smaller dimension) than the second. Although the invention is not limited to particular allotropic alloys, the material used in this specifically described embodiment is a marmem alloy.

A class of materials that utilize allotropic states is found in certain iron alloys. Such materials, commonly known as shape-memory alloys, have the property that, if such alloys are plastically deformed at one temperature, they will completely and permanently recover their original shape upon being raised to a higher, predetermined temperature. In such specific alloys, austenite is one allotropic phase or crystaline formation of the material and martensite is a second allotropic stage or crystaline form. The two crystaline forms have, among other properties, different hardnesses and different densities owing to their different arrangements of atoms in the crystaline lattice.

The procedure for forming shapes out of a shape-memory alloys, such as marmem, for example, is well known. In order to exhibit memory, an alloy must undergo an allotropic phase transformation. The temperature at which the memory is accomplished is a function of the temperature at which the allotropic formation begins or the higher temperature at which the alloy reverts to the parent phase. In the case of a marmem alloy, an initial shape is formed of the alloy, and the object is betatized and quenched, forming martinsite crystals within the alloy. The object may then be deformed to any shape at room temperature, which results in the martensite crystals being under stress. If the temperature of the object is raised above the austenite temperature, austenite begins to replace the martensite crystals, resulting in the object returning to its original shape which it had after betatizing and quenching. When the austenite transformation of the martensite crystals is complete, the object will have completely returned to its original shape.

To properly form outer portion 41 of the allotropic alloy so that it may seal the internal peripheral surface 43, plug body 30, outer portion 41, and annular rings 42 are shaped prior to depositing the exothermic compound 32 into internal cavity 31. The diameter of internal peripheral surface 43 of tube 15 which is to be sealed is determined, typically based on industry standards and specifications. The outer diameter of annular rings 42 is then machined in the first allotropic form which is of relatively high density form so that the rings 42 will expand to a larger diameter when the alloy changes to its second allotropic state. In the specific case of marmem, the outer diameter of annular rings 42 are reduced to a martensitic diameter of 0.003 to .0004 inches less than the diameter of internal peripheral surface 43 by machining at a temperature below the martensite transformation temperature. This machining creates martensite crystals under stress in annular rings 42 and outer portion 41. Plug body 30 may also be deformed during this process, also resulting in martensite crystals under stress. Plug 29 is then constructed as described above by filling with the exothermic compound 32, and plugging.

In use, plug body 30 is inserted into tube 15 where it sits adjacent internal peripheral surface 43. At this point, there is 0.003 to 0.004 inches clearance between the outer diameter of annular rings 42 and the inner diameter of internal peripheral surface 43. Ends 39 and 40 are connected to a source of electricity (not shown), and electrical current is caused to flow through wire 37.

As a result of the flow of electrical current, loop 38 is heated and ignites the exothermic compound 32.

Alternatively, in this or other embodiments described below, wire 37 may have only one end which is connected to a source of electricity, while the other end is in electrical contact with the exothermic compound 32. Tube 15 would be connected to the source of electricity, causing electricty to flow through the exothermic compound 32, thereby igniting the exothermic compound 32.

The magnesium 32 burns at a temperature high enough to provide sufficient heat to raise the temperature of annular rings 42 above the transformation temperature. This results in an expansion of annular rings 42 whereby the outer diameter of annular rings 42 returns to the austentitic or second allotropic diameter, which is greater than the diameter of internal peripheral surface 43. The result of this expansion is that annular rings 42 expand into sealing engagement with internal peripheral surface 43, causing some localized deformation of annular rings 42 and internal peripheral surface 43.

The heat generated by the burning magnesium 32 also melts the sealant compound 44, thereby allowing gases created by the burning exothermic compound 32 to escape through hole 36 to the ambient environment. The result of this procedure is that tube 15 has been permanently sealed by plug 29. When plugs are installed into each end 16 and 17 of leaking tubes 15 in feed water heater 1, the feed water heater has been repaired and may be returned to service.

Figure 5:
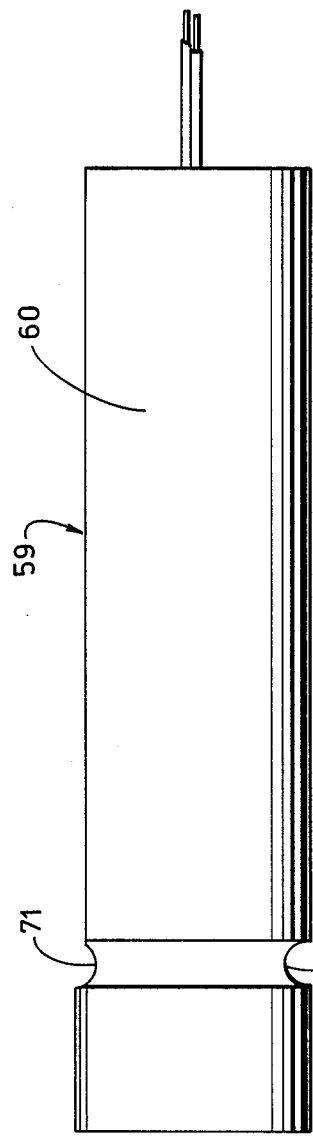
FIG. 5 is a side view of a second embodiment of the present invention.
Figure 7:
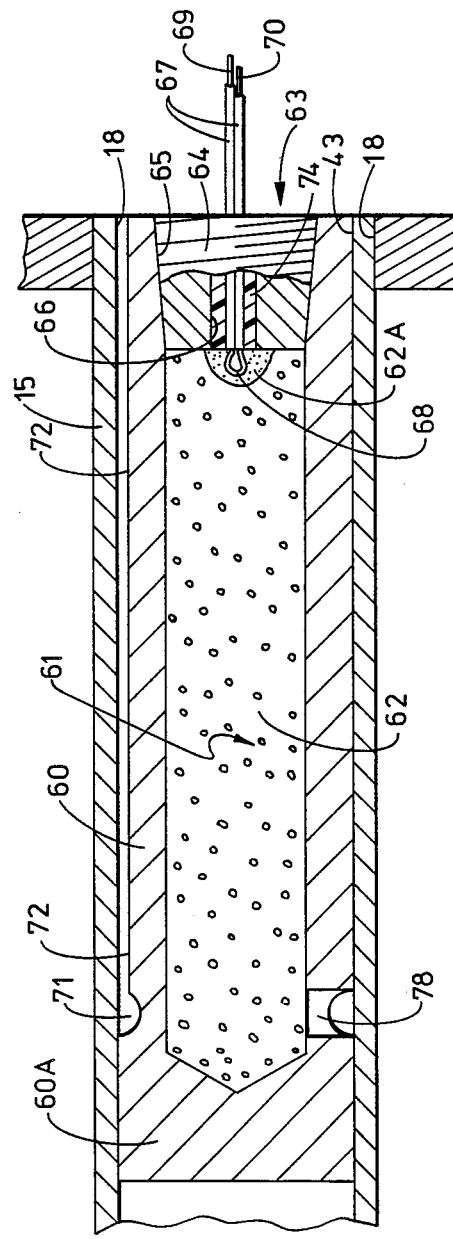
FIG. 7 is a cross sectional side view of the embodiment of the present invention as shown in FIGS. 5 and 6, shown disposed in a tube.

FIGS. 5, 6 and 7 show a second embodiment of the present invention. A plug body 60 is shown having an internal cavity 61. Internal cavity 61 is almost completely filled with a highly exothermic compound, in this case thermite 62. Thermite is well known in industry and is a blend of finely divided aluminum and iron oxide which, when ignited, reacts to produce molten iron and aluminum oxide. The temperatures attained reach about 3,000° C., and thermite may therefore be used for welding.

Internal cavity 61 has an opening 63 which is sealed by plug 64. Plug 64 is shown as being a tapered plug which is threaded into engagement with a tapped wall 65 adjacent opening 63. Plug 64 has a hole 66 which communicates directly with internal cavity 61. Wire 67 is disposed through hole 66 and forms loop 68 inside of an internal cavity 61. Loop 68 is in direct contact with igniter material 62a, in this case magnesium. Magnesium 62a is also in direct contact with thermite 62. Ends 69 and 70 of wire 67 are connectable to a source of electricity (not shown). Plug body 60 has a head portion 60a at the end opposite opening 63. The outside diameter of head portion 60a is approximately 0.002 inches less than the diameter of internal peripheral surface 43 of the tube. The outer diameter of head portion 60a is separated from the rest of the plug body 60 by annular groove 71. The outside diameter of the remainder of the plug body is smaller than the outside diameter of head portion 60a, allowing clearance between the plug body 60 and the internal peripheral surface 43 of the tube. Relief 72 is formed along part of the length of plug body 60, running from annular groove 71 to the end of plug body 60 opposite head portion 60a. Hole 78 communicates directly with internal cavity 61 and annular groove 71. Hole 73 is located on the opposite side of plug body 60 from relief 72.

In use, plug 59 is inserted into tube 15 with relief 72 oriented vertically upward, and hole 73 oriented vertically downward. In the event tube 15 is in a vertical position, plug body 59 is inserted downwardly into tube 15 with no special orientation of relief 72 or hole 73. Once inserted into tube 15, there is approximately 0.002 inches of clearance between the outer diameter of head portion 60a and the inner diameter of internal peripheral surface 43. Ends 69 and 70 are connected to a source of electricity (not shown), and electrical current is caused to flow through wire 37. As a result of the flow of electrical current, loop 68 is heated and ignites magnesium 62a. Magnesium 62a burns at a temperature high enough to ignite thermite 62. As in the case of the first described embodiment, the magnesium or other exothermic material may be ignited by a pyrotechnic fuse.

As the thermite of this described embodiment burns, it produces molten iron and aluminum oxide. The sealant 74 melts due to the heat and gases are thereby allowed to escape, through hole 66 preventing any explosion due to increased pressures within internal cavity 61. As gases form, pressure builds up in internal cavity 61. The pressure forces the molten iron through hole 73, into annular groove 71, thereby completely filling the area bound by annular groove 71 and the internal peripheral surface 43 of tube 15. Excess molten iron flows along the space between internal peripheral surface 43 and relief 72, thereby insuring that annular groove 71 is completely filled bY molten iron. In this regard, it is noted that molten iron is heavier than other combustion Products and flows preferentially below the "slag" to assure clean metal-to-metal contact. When the iron solidifies, a permanent seal is formed between plug body 60, head portion 60a and internal peripheral surface 43.

FIGS. 8 and 9 show a third embodiment of the present invention. The plug 79 is shown having a plug body 80 which comprises a head portion 81 and a shank 82. Shank 82 has a tapered portion 83 which connects with head portion 81. End 84 of shank 82 has external threads 85 on the outside surface 86 of shank 82. Internal cavity 87 is formed inside of plug body 80.

Solid thermite 88 is disposed about shank 82 and tapered portion 83. Piston 89 is axially disposed about shank 82, and is urged against the thermite 88 by a spring 90. End 90a of spring 90 is fixed axially immovable relative to shank 82 by nut 91. End 90b of spring 90 is free to move axially relative to shank 82. Spring 90 is at least partially compressed by nut 91, which has internal threads 92 which are intermeshed with external threads 85 of shank 82.

The outside diameter of piston 89 is smaller than the inside diameter of internal peripheral surface 43, causing piston 89 to have a cross sectional area which is smaller than the interior cross sectional area of tube 15. The outside diameter of head portion 81 is approximately 0.002 inches smaller than the inside diameter of internal peripheral surface 43. Wire 93 is shown partially disposed inside of internal cavity 87. Internal cavity 87 is sealed by sealant material 94, at end 84 which also holds wire 93 in place. Loop 95 is formed in wire 93 and is in direct contact with igniter material 96, in this case magnesium. Magnesium 96 is in direct contact with thermite 88. Ends 97 and 98 of wire 93 are connectable to a source of electricity (not shown) or to a pyrotechnic fuse.

Thermite 88 has a diameter which is smaller than the inside diameter of internal peripheral surface 43. This allows plug 79 to be easily inserted into tube 15.

In use, plug 79 is inserted into tube 15 where it sits adjacent internal peripheral surface 43. At this point, there is approximately 0.002 inches of clearance between the outer diameter of head portion 81 and the inner diameter of internal peripheral surface 43. Ends 97 and 98 are connected to a source of electricity (not shown), and electrical current is caused to flow through wire 93. As a result of the flow of electrical current, loop 95 is heated and ignites magnesium 96. Magnesium 96 burns at a temperature high enough to ignite thermite 88.

As thermite 88 ignites, molten iron and aluminum oxide are produced. During this process, the thermite reduces substantially in volume. As the thermite turns into molten iron, and reduces in volume, piston 89 exerts a force against the molten iron, due to the compression of spring 90. As the thermite liquifies, gases escape around the outside diameter of piston 89. Piston 89 slides axially along shank 82 toward head portion 81, thereby forcing the molten iron into the area of clearance between head portion 81 and internal peripheral surface 43. The molten iron is held in place by piston 89 until it solidifies, resulting in a Permanent seal between head portion 81, shank 82 and internal peripheral surface 43.

The foregoing description of preferred embodiments of the invention has been presented for purposes of illustration and description. It is not intended to be exhaustive or to limit the invention to the precise form disclosed. For example, while the invention is specifically disclosed in the context of a feed water heater, it could be employed in any number of heat exchangers or other devices where it might be desirable to plug the tube ends. Obvious modifications or variations are possible in light of the above teachings. The embodiments were chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A device for sealing the internal peripheral surface of a tube, comprising:
    (a) a plug body, said plug body including means for sealing the internal peripheral surface of a tube in response to the elevation of the temperature of said sealing means above a predetermined level;
    (b) a heat source adapted for elevating the temperature of said sealing means above a predetermined level, said heat source comprising a combustible exothermic compound and being operational to selectively raise the temperature of said sealing means in response to a predetermined activation; and
    (c) means for activating said heat source thereby effecting the temperature elevation of said sealing means above the predetermined level so as to seal the internal peripheral surface of the tube with the sealing means.

2. The device as claimed in claim 1 wherein said sealing means comprises an outer portion disposed about said plug body, said outer portion being made of an alloy having at least two alloptropic states.

3. The device as claimed in claim 2 wherein said outer portion has an outer diameter equal to or less than a predetermined diameter in a first alloptropic state and a diameter greater than the predetermined diameter in a second allotropic state.

4. The device as claimed in claim 2 wherein said outer portion includes a plurality of spaced apart external annular rings formed in the periphery of said outer portion.

5. The device as claimed in claim 2 wherein said outer portion is integral with said plug body.

6. The device as claimed in claim 1 wherein said exothermic compound is magnesium.

7. The device as claimed in claim 1 wherein said actuating means is an electrical wire connectable to a source of electricity, said wire being in thermal contact with said exothermic compound, whereby electricity may flow through said wire causing said exothermic compound to be activated.

8. The device as claimed in claim 7 wherein said plug body defines an internal cavity, said cavity having an opening at one end of said plug body, said exothermic compound being at least partially disposed in said internal cavity.

9. The device as claimed in claim 8 further comprising means for sealing said opening of said internal cavity.

10. The device as claimed in claim 9 wherein said opening sealing means comprises a plug.

11. The device as claimed in claim 10 wherein said electrical wire has two ends and a loop, said loop disposed in direct physical contact with said exothermic compound.

12. The device as claimed in claim 11 further comprising a hole defined by said plug, said hole communicating with said internal cavity and with the ambient environment, said wire disposed through said hole such that said loop is disposed within said cavity and said ends are disposed external to said internal cavity.

13. The device as claimed in claim 12 wherein said hole is sealed with a sealant which has a melting temperature that is lower than the activation temperature of said exothermic compound.

14. The device of claim 1, wherein said activating means comprises a pyrotechnic fuse.

15. A device for sealing the internal peripheral surface of a tube, comprising:
    (a) a plug body, said plug body including means for sealing the internal peripheral surface of a tube in response to the elevation of the temperature of said sealing means above a predetermined level, and having an internal cavity formed therewithin;
    (b) a heat source adapted for elevating the temperature of said sealing means above a predetermined level, said heat source comprising a combustible exothermic compound deposited within said internal cavity and being operational to selectively raise the temperature of said sealing means in response to a predetermined activation; and
    (c) means for activating said heat source thereby effecting the temperature elevation of said sealing means above the predetermined level so as to seal the internal peripheral surface of the tube with the sealing means.

16. The device of claim 15 further comprising a hole defined by said plug body, said hole communicating with said internal cavity and with the ambient environment, and wherein said activating means extends through said hole from outside said plug body and is partially disposed within said internal cavity.

17. The device of claim 15 wherein said actuating means comprises an electrical wire connectable to a source of electricity, said wire being in contact with said exothermic compound whereby electricity may be flowed through said wire causing said exothermic compound to be activated.

18. The device as claimed in claim 15 wherein said activating means comprises a combustible fuse.

* * * * *

UNITED STATES PATENT AND TRADEMARK OFFICE
CERTIFICATE OF CORRECTION

PATENT NO. : 4,976,307

DATED : December 11, 1990

INVENTOR(S) : Charles Hall and Michael Fry

It is certified that error appears in the above-identified patent and that said Letters Patent is hereby corrected as shown below:

Claim 2 - Column 9 - Line 65 - "alloptropic" should read "allotropic"

Claim 3 - Column 9 - Line 68 - "alloptropic" should read "allotropic"

Signed and Sealed this

Nineteenth Day of May, 1992

*Attest:*

DOUGLAS B. COMER

*Attesting Officer*   *Acting Commissioner of Patents and Trademarks*